A. A. BACKHAUS.
METHOD FOR THE PRODUCTION OF ESTERS.
APPLICATION FILED MAY 23, 1919.

1,400,852.

Patented Dec. 20, 1921.
2 SHEETS—SHEET 1.

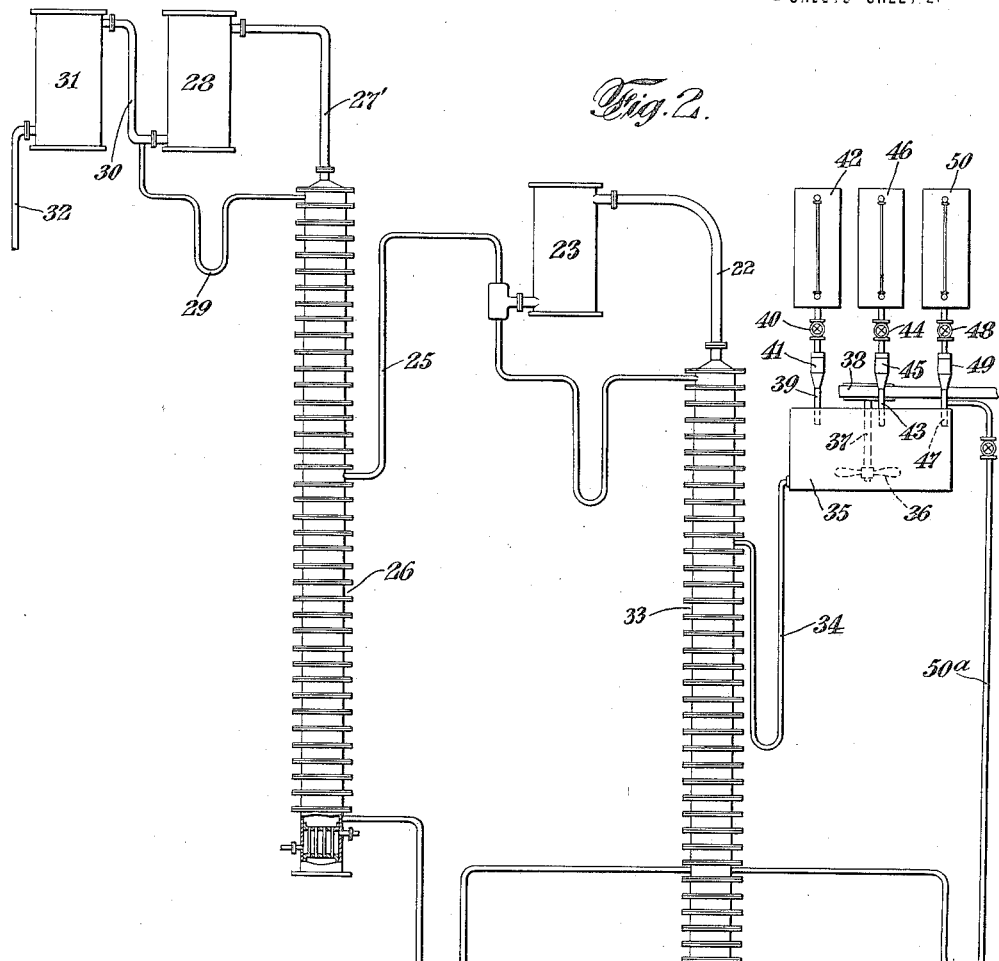
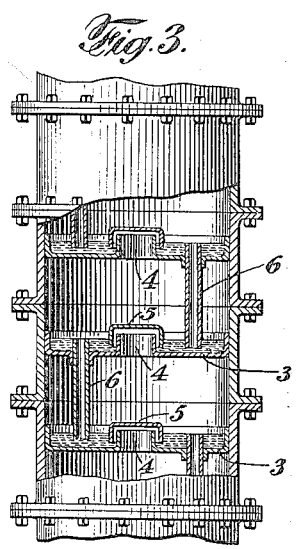

UNITED STATES PATENT OFFICE.

ARTHUR A. BACKHAUS, OF BALTIMORE, MARYLAND, ASSIGNOR TO U. S. INDUSTRIAL ALCOHOL CO., A CORPORATION OF WEST VIRGINIA.

METHOD FOR THE PRODUCTION OF ESTERS.

1,400,852.    Specification of Letters Patent.    Patented Dec. 20, 1921.

Application filed May 23, 1919. Serial No. 299,223.

*To all whom it may concern:*

Be it known that I, ARTHUR A. BACKHAUS, a citizen of the United States, residing at Baltimore, in the State of Maryland, have invented a certain new and useful Improvement in Methods for the Production of Esters, of which the following is a specification.

My invention relates particularly to a process by means of which esters may be made by fermentation, etc.

The object of my invention is to provide a process by means of which esters may be made in an advantageous manner from carbohydrates by the fermentation of the same, and the continuous esterification of the acids obtained in the fermentation, and particularly the higher acids of the paraffin series.

Further objects of my invention will appear from the detailed description thereof set forth hereinafter.

While my invention is capable of embodiment in many different forms, for the purpose of illustration I shall describe only certain forms of the same hereinafter, and while it is capable of being carried out in connection with many different types of apparatus, I have shown only certain types of apparatus for use in connection therewith in the accompanying drawings, in which:

Fig. 2 is a diagrammatic representation of another type of apparatus which may be used in connection with my invention, and Fig. 3 is an enlarged vertical section of a detail of one of the columns.

Figure 1:
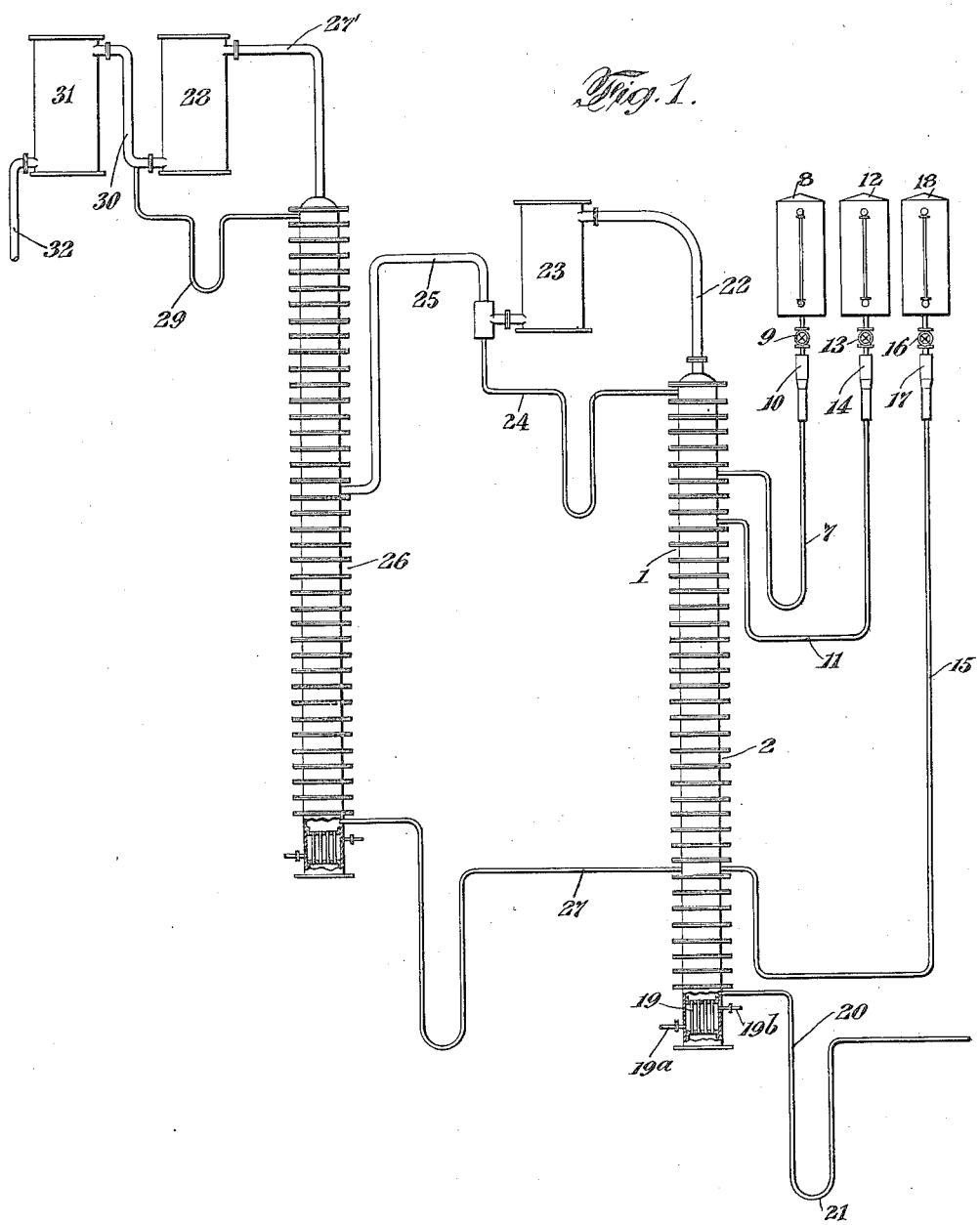
Figure 1 is a diagrammatic representation of an apparatus which may be used in accordance with my invention.

In carrying out my process, it will be understood that different types of materials containing carbohydrates may be operated upon, but by way of example my process may be carried out by treating distillery waste. The distillery waste may be the waste material obtained in the production of ethyl alcohol from molasses, potatoes or grains of various kinds, such as wheat, rye, barley, corn, etc. Preferably, however, the waste materials which I treat in accordance with my process are obtained from the production of alcohol from molasses, which molasses may be obtained in the manufacture of cane or beet sugar.

The distillery waste may be treated in accordance with my process without previous concentration, but preferably is evaporated until it has a density of approximately 10° Bé. or higher. Thereupon, I add to the distillery waste bacteria to bring about the production of fatty acid among other products. The bacteria which I use for this purpose may be obtained from any suitable source, but the bacteria which I have found suitable for this purpose may be swamp bacteria, that is to say, the bacteria contained in the mud of swamps, bacteria obtained from the feces of herbaceous animals, bacteria from garden soil, bacteria from ensilage, bacteria from sauer-kraut, and the bacteria from decaying grape fruit. The distillery waste after having been inoculated with bacteria from one of the above sources, but preferably the bacteria from ensilage, is maintained at a temperature of 25° to 50° C. but preferably 35° C., for a period of several days. Inasmuch as the distillery waste is normally of an acid character this fermentation will take place in an acid medium. It is to be understood, however, that if desired, the medium may be rendered neutral or alkaline by the addition of an alkali of any desired character, as for example, calcium carbonate or sodium carbonate or lime. A slightly higher yield is obtained in an alkaline medium. Furthermore, it will be understood that other temperatures may be maintained. A low temperature favors somewhat an increase in the production of acetic acid, while a high temperature favors somewhat an increase in the production of butyric acid. The products obtained in the fermentation under the preferred conditions above referred to comprise among other constituents:

40 parts by weight of acetic acid,
45 parts by weight of propionic acid, and
45 parts by weight of butyric acid.

The entire fermented product, including the organic acids referred to, as well as the remainder of the distillery waste is then fed into the esterification apparatus which may be such as is shown in the drawings. The apparatus in question is of two types shown in Figs. 1 and 2 respectively, either of which may be used.

Referring first to Fig. 1, I have shown a column still 1 comprised of an outer casing 2, and a large number of plates or pans 3 having central openings 4 covered by hoods or bells 5, the edges of which are sealed in the liquid carried by said plates 3, the adjacent plates being connected by overflow pipes 6. I supply to the upper part of the column still 1, and preferably continuously a quantity of sulfuric acid preferably having a strength of 50° Bé. to 66° Bé., by means such as a trapped pipe 7 leading from a sulfuric acid tank 8 and having its outlet controlled by means such as a needle valve 9 and a sight feed 10. The sulfuric acid is ordinarily fed in the proportion of five parts by weight of sulfuric acid having a strength of 50° Bé. to 66° Bé., to 100 parts by weight of fermented distillery waste containing 3 per cent. by weight of the mixed organic acids in the proportion above referred to, the mixed organic acids being ordinarily fed continuously to the still 1 by a trapped pipe 11 leading from an organic acid tank 12 which may be provided with a needle valve 13 and a sight feed 14. In addition, methyl alcohol having a strength of approximately 95% is also ordinarily continuously fed in the proportion of 2 parts by weight, through a trapped pipe 15 controlled by means such as a needle valve 16 and a sight feed 17, leading from an alcohol tank 18. Initially, before feeding through the pipes 10, 11 and 15, however, sufficient methyl alcohol is preferably fed into the apparatus to fill all the pans in the column still 1. The proportion of alcohol is varied, however, according to the strength of the esters that are desired to be obtained. The still 1 is shown as heated at its lower end by means of a tubular heater 19 having inlet and outlet steam pipes 19ª and 19ᵇ. The effluent water materials and sulfuric acid are conducted away from the still 1 by means such as a pipe 20 shown as having a trap 21 therein. From the upper portion of the still 1, means such as a vapor discharge pipe 22 is provided to conduct away the vapors of the methyl esters to means such as a dephlegmator 23 having a trapped return pipe 24 for returning crude esters to, for example, the top of the column still 1, as well as a discharge means such as pipe 25 for conveying the methyl ester vapors to a second column 26, which may be constructed in the same manner as the column 1, except that this column is not ordinarily provided with several inlets, and with the exception that a trapped discharge pipe 27 conveys away the methyl alcohol from the lower portion of said column 26 to the column 1 at a point which may be opposite to the entry of the pipe 15. In the embodiment shown the vapors from the pipe 25 ascend in the column 26 through a descending current of methyl alcohol, and the vapors of methyl esters containing a small amount of methyl alcohol, are conveyed by means such, as a pipe 27' to a dephlegmator 28 from which the condensed methyl alcohol preferably returns by a trapped pipe 29 to the top of the column 26, while the vapors of methyl esters are ordinarily conducted by a pipe 30 to a condenser 31 from which the condensed methyl esters are drawn off by means such as a pipe 32. The methyl esters produced in this manner are substantially water-free as shown by test with anhydrous copper sulfate.

The above apparatus is especially useful where the organic acid solution operated upon is somewhat dilute. Where it is stronger, however, a somewhat different arrangement of apparatus may be used, such for example as the apparatus shown in Fig. 2. The apparatus shown in Fig. 2 may be constructed the same as the apparatus shown in Fig. 1, except in the following respects: In this instance, I have provided a column 33 which may be constructed the same as the column 1, except that there is only one trapped inlet pipe 34 which leads from a mixing tank 35 provided with agitating means such as a propeller 36 carried by a shaft 37, and rotated by a pulley 38 from any suitable source of power. Sulfuric acid is ordinarily continuously fed to the tank 35 by means such as a pipe 39 having a needle valve 40 and a sight feed 41 connected to a sulfuric acid tank 42. In this instance, the sulfuric acid is ordinarily fed to the mixing tank 35 in the proportion of 20 parts by weight of sulfuric acid having a strength of 50° Bé. to 66° Bé., to 100 parts by weight of the fermented distillery waste containing 15 per cent. by weight of the mixed acids in the proportions above referred to, which is ordinarily fed continuously to the tank 35 by means such as a pipe 43 having a needle valve 44 and a sight feed 45 connected to an organic acid tank 46. At the same time methyl alcohol having a strength of 95 to 98% is ordinarily continuously fed in the proportion of 10 parts by weight to the tank 35 by means such as a pipe 47 having a needle valve 48 and a sight feed 49 connected to an alcohol tank 50. Initially, before feeding through the pipe 34, a quantity of methyl alcohol sufficient to fill the pans in the still 33 is preferably introduced by means such as a valved pipe 50ª. In this instance, the reaction by which esters are formed takes place partly within the tank 35, although the reaction takes place in part also in the column 33. Said column 33 is shown as provided with a liquid outlet pipe, a vapor outlet pipe, alcohol return pipes, and other connections, which may be just the same as in the apparatus shown in Fig. 1.

In carrying out my process, reference being had to Fig. 1, the sulfuric acid, the fermented distillery waste containing dilute organic acids and methyl alcohol are ordinarily fed continuously into the still 1, and the reaction by which esters are formed takes place within said column, and the heat which is applied to said column drives off the vapors of esters and methyl alcohol from the top of the column to the dephlegmator, from which the condensed water carrying some alcohol is returned to the top of the column to form liquid seals and to provide a descending body of methyl alcohol therein. The ester vapors, thus partly freed from methyl alcohol, pass then to the second or rectifying column 26 in which nearly all of the methyl alcohol is ordinarily removed and returned as a liquid to the column 1, while the ester vapors containing a small amount of methyl alcohol pass out of the same into the dephlegmator 28 from which point the remaining quantity of methyl alcohol is returned to the column 26. The ester vapors then pass to the condenser 31 from which the condensed esters may be continually drawn off.

In carrying out the process the esterification is carried out more completely and more rapidly by reason of the continual removal by distillation of the esters from the esterification zone, and because of the provision of much larger quantities of methyl alcohol than are needed for the reaction. The quantity of methyl alcohol present in the column 1 is from three to four times the quantity of methyl alcohol required in the reaction. Furthermore, the smaller the percentage of the organic acids in the descending current of liquid in the still 1, which becomes weaker in the acids as it descends, the larger the quantity of methyl alcohol required to offset the difficulty of esterification, and therefore, a large quantity of methyl alcohol is fed in at a point where the liquid is very weak in organic acids and in such quantity as to complete the esterification before the liquid reaches the lower end of the column still 1.

In case the apparatus shown in Fig. 2 is used, the operation is ordinarily the same as in the case of the apparatus shown in Fig. 1, except that in the apparatus shown in Fig. 2 the sulfuric acid, fermented distillery waste and methyl alcohol are fed into the mixing tank 35 continually, in which tank the esters are partly formed, while the mixed liquids are drawn off from said tank 35 by a single pipe 34 to the column still 33. Here, because of the strength of the organic acids the reaction can be effected to a large degree merely by mixing the reagents, and this is done, therefore, in the tank 35, so as to relieve the still 33 correspondingly, in order to increase its capacity. In this instance, the remainder of the process operates the same as in the case of the process used in the apparatus shown in Fig. 1. Many different esters may be thus formed, as for example, methyl acetate, methyl propionate and methyl butyrate, and these esters may be separated by fractional distillation or utilized in any other desired manner. Furthermore, it will be understood that, if desired, one or more of the organic acids formed by the fermentation of the distillery waste may be removed, and the several portions of the fermented distillery waste may then, if desired, be esterified separately in the manner hereinabove described. Also, it will be understood that if desired the particular alcohol used, the organic acid or acids and the sulfuric acid may be introduced intermittently into the tank 35 and the esterification carried out continuously by feeding the same continuously to the column 33.

It will be understood that other acids may be contained in the mixture which is esterified, and that other alcohols may be used instead of the methyl alcohol, as for example ethyl alcohol. Also instead of the sulfuric acid another catalyst may be used, as for example, niter cake, or hydrochloric or any phosphoric acid.

By the term "counter-current" in the claims it is intended to cover the movement of the distillery waste, or the dilute acids, and alcohol in opposite directions, either in the form of continuous streams or in the form of intermittent streams such as streams or currents formed by the successive vaporization and condensation or absorption of one of the reacting materials in a manner to advance the relative position of any given part of the liquid.

While I have described my invention above in detail, I wish it to be understood that many changes may be made therein without departing from the spirit thereof.

I claim:

1. The process of manufacturing esters comprising passing an acid fermented distillery waste in counter-current to gradually increasing concentrations of an alcohol in the presence of a catalytic agent while distilling off the esters formed.

2. The process of manufacturing esters comprising passing an acid fermented distillery waste in counter-current to gradually increasing concentrations of an alcohol in the presence of a catalytic agent while continuously distilling off the esters and removing the water formed.

3. The process of manufacturing esters comprising passing an acid fermented distillery waste and a catalytic agent in counter-current to gradually increasing concentrations of an alcohol while distilling off the esters formed.

4. The process of manufacturing esters comprising passing an acid fermented distillery waste and a catalytic agent in counter-current to increasing concentrations of an alcohol while continuously distilling off the esters and removing the water formed.

5. The process of manufacturing esters from diluted acid fermented distillery waste comprising passing about 100 parts such dilute waste and about 5 parts strong sulfuric acid in counter-current, to gradually increasing concentrations of an alcohol while continuously distilling off the esters formed.

6. The process of manufacturing esters from dilute organic acids comprising passing such acid and strong sulfuric acid in the proportion of about 100 parts dilute acid and about 5 sulfuric acid down a column still in counter-current to increasing concentrations of an alcohol while distilling off the esters formed.

7. The process of manufacturing esters from dilute organic acids comprising passing such acid and strong sulfuric acid in the proportion of about 100 parts dilute acid and about 5 parts sulfuric acid down a column still in counter-current to increasing concentrations of an alcohol while continuously distilling off the esters formed and continuously removing the aqueous mineral acid near the bottom of the still, and separating the esters from the alcohol in the distillate.

8. The process of manufacturing esters from dilute organic acids comprising passing such acid and strong sulfuric acid in the proportion of about 100 parts dilute acid and about 5 parts sulfuric acid down a column still in counter-current to gradually increasing concentrations of an alcohol, removing the aqueous acid from the bottom of the still, continuously distilling off the esters from the top of the still, passing the ester vapors into a second still and separating them from the alcoholic vapors.

9. The process of manufacturing acetic, propionic, and butyric acid esters of methyl alcohol from dilute fermented distillery waste comprising passing such dilute acids and strong sulfuric acid in the proportion of about 100 parts dilute acid and 5 parts sulfuric acid down a column still in counter-current to increasing concentrations of methyl alcohol, while distilling off the esters formed.

10. The process of manufacturing acetic, propionic, and butyric acid esters of methyl alcohol from dilute acid fermented distillery waste comprising passing such acids and strong sulfuric acid in the proportion of about 100 parts dilute acid and about 5 parts sulfuric acid down a column still in counter-current to increasing concentrations of methyl alcohol, continuously removing the aqueous mineral acid from the bottom of the still, distilling off the esters formed and condensing methyl alcohol therefrom, passing the ester vapors into a second still supplied with methyl alcohol, distilling off the esters from said second still while continuously removing the methyl alcohol condensed by passing it from the bottom of the still back to the first still, and continuously condensing the methyl alcohol from the distilled esters, and collecting the esters.

11. The process of manufacturing esters from an acid fermented distillery waste comprising introducing near the top of a column still provided with overflow plates filled with an alcohol, strong sulfuric acid and distillery waste, continuously introducing an alcohol, heating the still to vaporize the alcohol and distil off the esters formed, removing the aqueous acid from the bottom of the still, and separating the ester from the alcohol distilled off.

12. The process of manufacturing esters from a mixture of dilute organic acids comprising passing such acids in counter-current to gradually increasing concentrations of an alcohol in the presence of a dehydrating agent while continuously distilling off the esters formed.

13. The process of manufacturing esters from a mixture of dilute organic acids comprising passing the acid down a column still in counter-current to an alcohol and in the presence of sulfuric acid of 50 to 66 degrees Bé., vaporizing the alcohol at the bottom of the still, and continuously distilling off the esters formed.

14. The process of manufacturing esters from a mixture of dilute organic acids comprising passing the acid in counter-current to increasing concentrations of an alcohol and in the presence of sulfuric acid of 50 to 66 degrees Bé. while distilling off the esters formed.

15. The process of manufacturing esters from fermented distillery waste containing dilute organic acids comprising passing such dilute acids in counter-current to increasing concentrations of an alcohol and in the presence of sulfuric acid of 50 to 66 degrees Bé., and continuously distilling off the esters formed.

16. The process of manufacturing esters comprising allowing a current of an acid fermented distillery waste to react with successive quantities of an alcohol of progressively increasing concentrations, and in the presence of a catalytic agent, while distilling off the esters formed.

17. The process of manufacturing esters comprising allowing a current of an acid fermented distillery waste to react with successive quantities of an alcohol of progressively increasing concentrations in the presence of a catalytic agent, while continuously distilling off the esters and removing the water formed.

18. The process of manufacturing esters comprising allowing a current of an acid fermented distillery waste and sulfuric acid to react with successive quantities of an alcohol while flowing down a column still provided with plates containing the alcohol, the alcohol on said plates increasing in concentration toward the bottom of the still, and distilling off the esters formed from the top of the still.

19. The process of manufacturing esters comprising allowing a current of an acid fermented distillery waste to react with successive quantities of an alcohol of progressively increasing concentrations in the presence of a catalytic agent while distilling off the esters formed, separating the esters from the alcohol in the distillate, and returning the alcohol to the still.

20. The process of manufacturing esters comprising allowing a current of an acid fermented distillery waste to react with successive separate quantities of an alcohol of progressively increasing concentrations and in the presence of a catalytic agent while distilling off the esters formed.

21. The process of manufacturing esters comprising allowing a current of an acid fermented distillery waste to react with successive separate quantities of an alcohol of progressively increasing concentrations in the presence of a catalytic agent while continuously distilling off the esters and removing the water formed.

22. The process of manufacturing esters comprising allowing a current of an acid fermented distillery waste to react with successive separate quantities of an alcohol of progressively increasing concentrations in the presence of a catalytic agent while distilling off the esters formed, separating the esters from the alcohol in the distillate, and returning the alcohol to the still.

23. The process of manufacturing esters comprising introducing an acid fermented distillery waste and a catalytic agent into a column still, introducing an alcohol into the still, and heating the latter to distil therefrom the ester formed.

24. The process of manufacturing esters comprising introducing an acid fermented distillery waste and a catalytic agent into a column still, introducing an alcohol near the bottom of the still, and heating the lower part of the still to distil therefrom the esters formed.

25. The process of manufacturing esters comprising introducing an acid fermented distillery waste and a catalytic agent into a column still, introducing an alcohol into the still below the point of introduction of the distillery waste, and heating the still near the point of introduction of the alcohol in order to vaporize the latter and distil off from the still the esters formed.

In testimony that I claim the foregoing, I have hereunto set my hand this 1st day of May, 1919.

ARTHUR A. BACKHAUS.